(12) United States Patent
Cords

(10) Patent No.: US 6,296,323 B1
(45) Date of Patent: Oct. 2, 2001

(54) METHOD AND APPARATUS FOR APPLYING A BRAKE FORCE IN A TOWED VEHICLE HYDRAULIC BRAKE SYSTEM PROPORTIONAL TO A HYDRAULIC PRESSURE GENERATOR POWER INPUT

(75) Inventor: Frederick W. Cords, LeSueur, MN (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 09/353,734

(22) Filed: Jul. 14, 1999

(51) Int. Cl.[7] .................................................. B60T 13/00
(52) U.S. Cl. ........................... 303/7; 303/3; 303/15
(58) Field of Search ............................. 303/7, 20, 3, 15; 188/1.11 E, 158

(56) References Cited

U.S. PATENT DOCUMENTS

| | | |
|---|---|---|
| 3,768,870 | 10/1973 | Howard . |
| 3,836,205 * | 9/1974 | Schwerin ................................. 303/7 |
| 3,887,238 * | 6/1975 | Bennett ................................... 303/7 |
| 4,054,325 * | 10/1977 | Popp ........................................ 303/7 |
| 4,072,362 * | 2/1978 | Van Anrooy ........................... 303/7 |
| 5,346,289 | 9/1994 | Cords . |
| 5,382,085 * | 1/1995 | Zbinden ................................... 303/7 |
| 5,779,324 * | 7/1998 | Cords et al. ............................. 303/7 |
| 5,823,637 * | 10/1998 | Blue ......................................... 303/7 |
| 5,876,100 | 2/1999 | Breckner et al. . |
| 6,079,792 * | 6/2000 | Kessler .................................... 303/7 |

FOREIGN PATENT DOCUMENTS

| | | | |
|---|---|---|---|
| PCT/US96/ 19233 * | 6/1997 | (WO) | ........................................ 303/7 |
| PCT/US96/ 20408 * | 7/1997 | (WO) | ........................................ 303/7 |

* cited by examiner

*Primary Examiner*—Robert J. Oberleitner
*Assistant Examiner*—Devon Kramer
(74) *Attorney, Agent, or Firm*—Brian B. Shaw, Esq.; Stephen B. Salai, Esq.; Harter, Secrest & Emery LLP

(57) ABSTRACT

A braking system for a towed vehicle having a hydraulic brake system wherein a continuously variable hydraulic pressure is generated to provide a corresponding and proportional brake force in the towed vehicle. A hydraulic pressure generator having an electric motor with variable electric input is employed to provide a corresponding a proportional hydraulic pressure by a hydraulic pressure generator, wherein the resulting variable hydraulic pressure is employed to provide a proportional braking force in the towed vehicle.

20 Claims, 5 Drawing Sheets

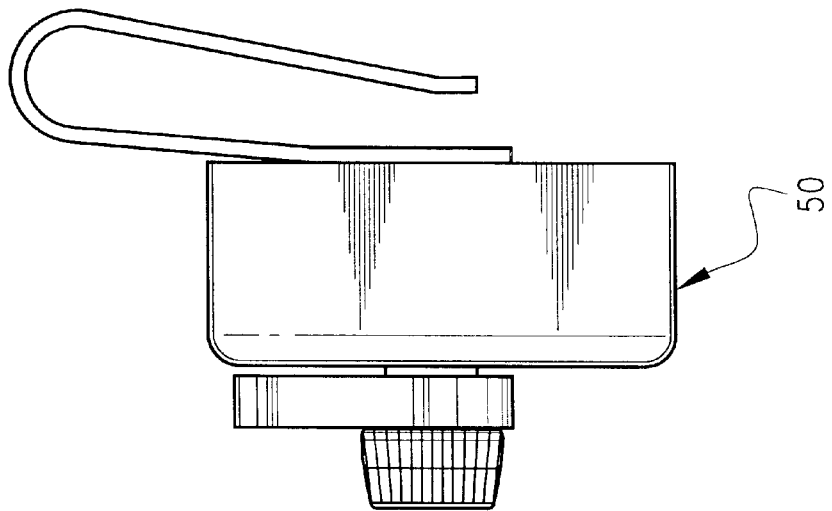
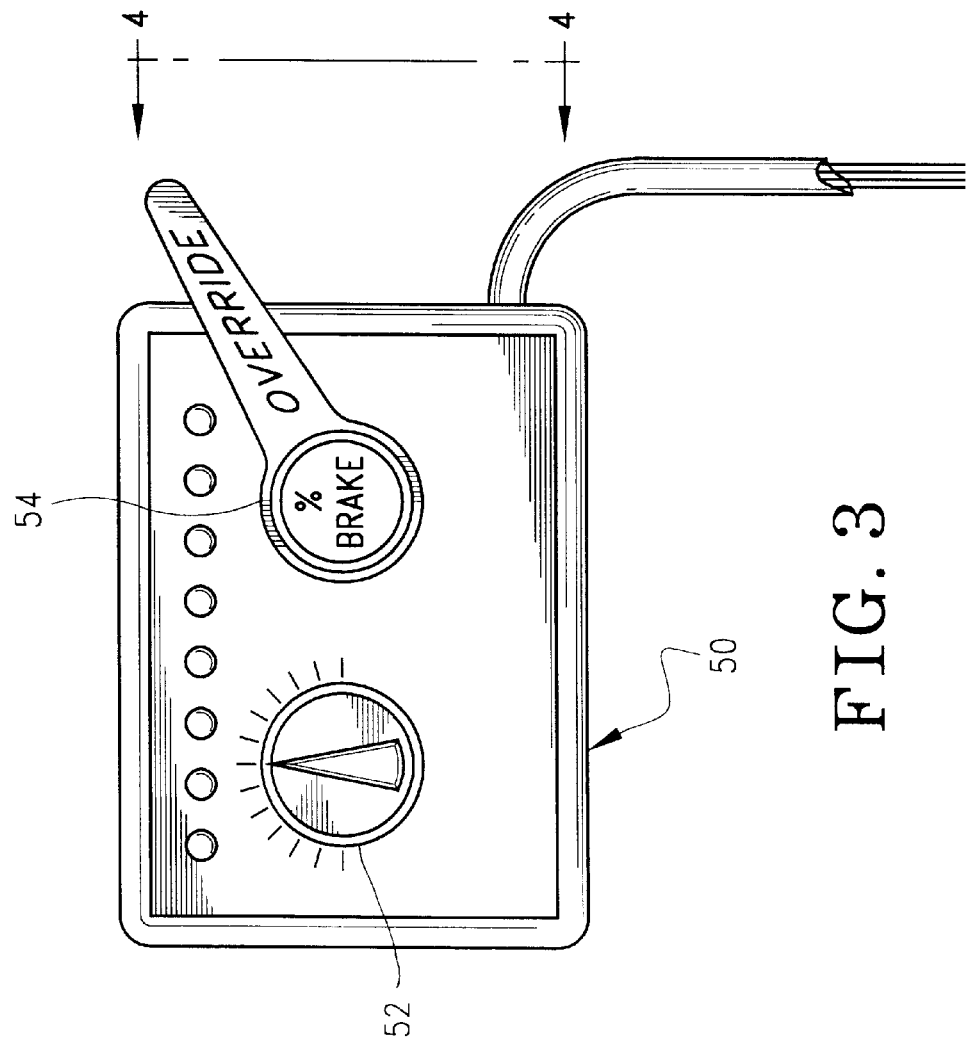
FIG. 3
FIG. 4

METHOD AND APPARATUS FOR APPLYING A BRAKE FORCE IN A TOWED VEHICLE HYDRAULIC BRAKE SYSTEM PROPORTIONAL TO A HYDRAULIC PRESSURE GENERATOR POWER INPUT

FIELD OF THE INVENTION

The present invention relates to hydraulic brake systems for a towed vehicle, and more particularly, to a braking system providing a controllable braking force proportional to the power input to a hydraulic pressure generator.

BACKGROUND OF THE INVENTION

Hydraulic brake systems are employed in a variety of towed vehicles including recreation and utility trailers. Conventional hydraulic braking systems in towed vehicles employ a surge brake. The surge brake has a hydraulic piston that controls the flow of hydraulic fluid to the towed vehicle brakes in response to relative motion between the trailer and the towing vehicle. The surge brake is typically mounted on the tongue of the towed vehicle and applies a braking pressure based on the pressure exerted between the towed vehicle and the towing vehicle.

It is generally desirable to control the braking forces that are applied to the towing vehicle and the towed vehicle to reduce disproportionate loads on the respective brake systems. Differences in braking force between the towed vehicle and the towing vehicle can result in significant problems. If the towed vehicle brake pressure is too great, then the towed vehicle will tend to drag the pulling vehicle to a stop upon application of the brakes. Alternatively, if the towing vehicle braking force is greater, the trailer will tend to over run the towing vehicle.

Therefore, the need exists for a braking system that can be controlled from within the towing vehicle to provide an appropriate braking force. A need also exists for a towed vehicle braking system that can be readily adjusted in response to varying road conditions. The need also exists for a braking system that does not require substantial valving, assembly and maintenance.

SUMMARY OF THE INVENTION

The present invention provides an apparatus and method for applying a hydraulic pressure to the brakes of a towed vehicle, and more specifically, provides for applying hydraulic pressure in proportion to a hydraulic pressure generator power input.

Generally, the present braking system includes a hydraulic system and a control system. The hydraulic system includes a hydraulic pressure generator, to which a variable and controllable amount of power is supplied to produce a proportional hydraulic pressure. The proportional hydraulic pressure acts on the towed vehicle brake system to provide a corresponding braking force.

A valve manifold is fluidly connected between the hydraulic pressure generator and the towed vehicle brake system. The valve manifold transmits a hydraulic pressure to the towed vehicle braking system proportional to the hydraulic pressure generator power input. The valve manifold also includes a bleed off capacity for release of the towed vehicle brakes as well as lubrication of the manifold.

A controller is connected to the hydraulic pressure generator for selectively setting the power input and hence hydraulic pressure applied to the towed vehicle brakes.

The present configuration provides a braking force that is completely variable and proportional to a power input to a hydraulic pressure generator. In the hydraulic pressure generator, the hydraulic pressure produced is proportional to the rotational velocity of a motor. The rotational velocity of the motor is directly proportional to its electrical power input. Hence, the hydraulic pressure and the braking force by the towed vehicle brake system are proportional to the electrical power input to the motor.

BRIEF DESCRIPTION OF THE DRAWINGS

FIG. 3 is a front elevational view of a user interface for the system.

FIG. 4 is a side elevational view taken along lines 4—4 of FIG. 3.

DETAILED DESCRIPTION OF THE PREFERRED EMBODIMENT

Figure 1:
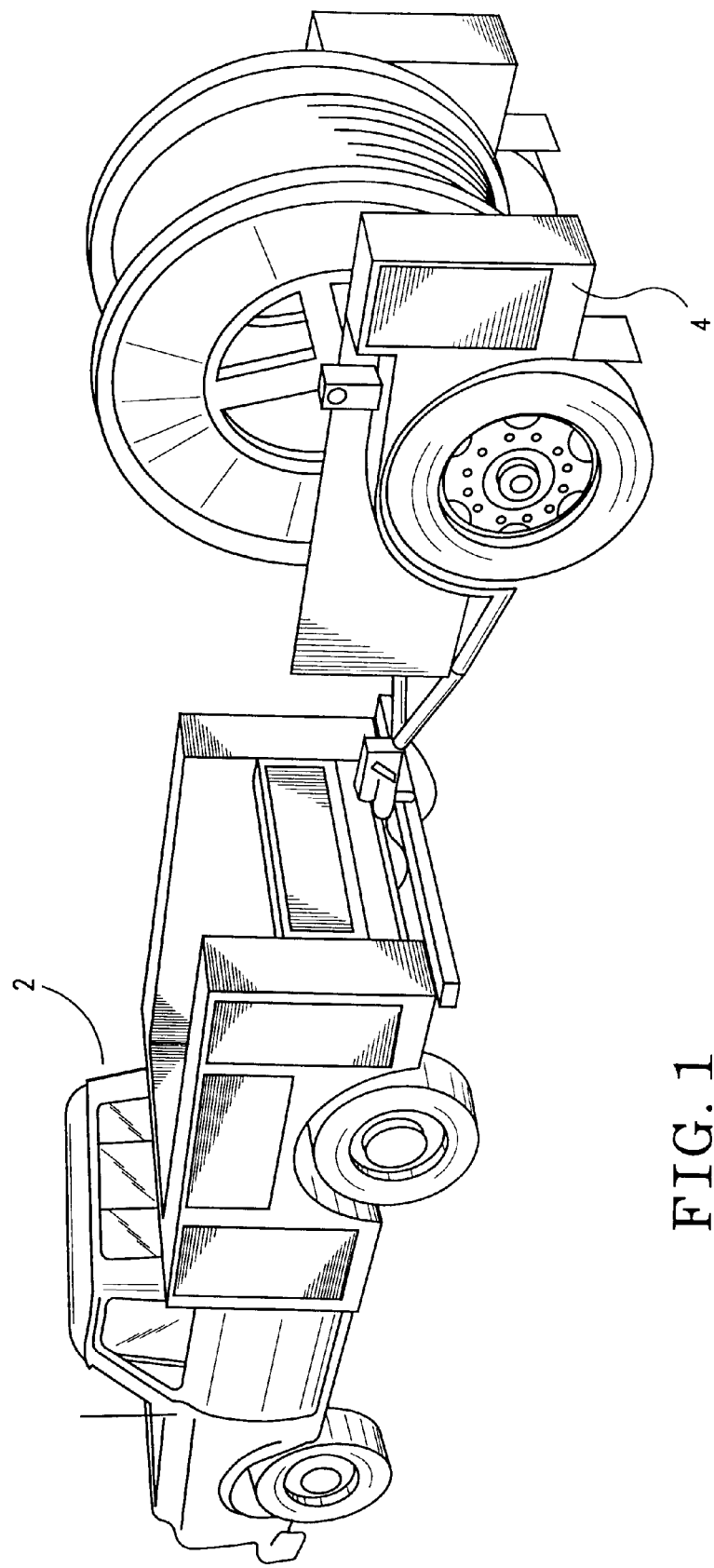
FIG. 1 is a perspective view of a light truck as a towing vehicle and a utility trailer as a towed vehicle employing the present system.

The present invention includes a braking system for interconnecting a towing vehicle 2 and a towed vehicle 4 having hydraulically actuated brakes. The present braking system may be partially located in both the towed vehicle and the towing vehicle or substantially completely within the towing vehicle.

The term "towing vehicle" includes any lead vehicle, which may or may not be powered and/or manned. The term "towed vehicle" encompasses any trailing vehicle, which may selectively be powered or manned. The towed vehicle has a rotatable wheel whose rotation is selectively resisted by a hydraulically actuated brake. The towed vehicle brake applies a braking force in response to a pressure in the hydraulic line. Typical brakes include, but are not limited to, drum and disc brakes.

The present braking system includes a hydraulic system and a control system.

Hydraulic System

The hydraulic system extends between the towing vehicle 2 and the towed vehicle 4. The hydraulic system includes a hydraulic pressure generator 10, a valve manifold 12, a hydraulic fluid reservoir 14, and associated fluid interconnections, such as hosing, piping and tubing.

The hydraulic pressure generator 10 includes a hydraulic pump 11 and a motor 13 ("motor/pump"). The hydraulic pump includes an inlet 15 and an outlet 16, wherein the inlet is connected to a source of hydraulic fluid and the outlet is connected to the valve manifold 12. The hydraulic pump 11 functions to increase the pressure in the hydraulic fluid at the outlet 16. The flow volume at the outlet of the hydraulic pump corresponds to the RPM of the pump. In a further configuration, the outlet pressure of the hydraulic pump is proportional to the RPM of the pump. The hydraulic pump may be any of a variety of hydraulic pumps. Series 1 HP pumps manufactured by Oildyne have been found suitable. These pumps are capable of going from zero pressure to a relief valve pressure (as set forth herein), in approximately 40 to 50 milliseconds.

The motor 13 is connected to the hydraulic pump 11 to rotate the pump. In a preferred configuration, the motor is an electric motor and preferably a dc electric motor. The speed of the motor (RPM) is proportional to the power input to the motor. By controlling the input power to the motor, the resulting RPM of the motor is controlled. Although the proportional relationship encompasses a variety of relationships, it is anticipated the relationship is directly proportional.

The valve manifold 12 is connected to the hydraulic pressure generator 10, the hydraulic fluid reservoir 14 and the towed vehicle brake system 18. The valve manifold provides a hydraulic pressure control between the hydraulic pressure generator 10 and the towed vehicle brake system 18.

The valve manifold includes four ports, a check valve 22 and metered unloading valve 24 and a relief valve 26.

Figure 2:
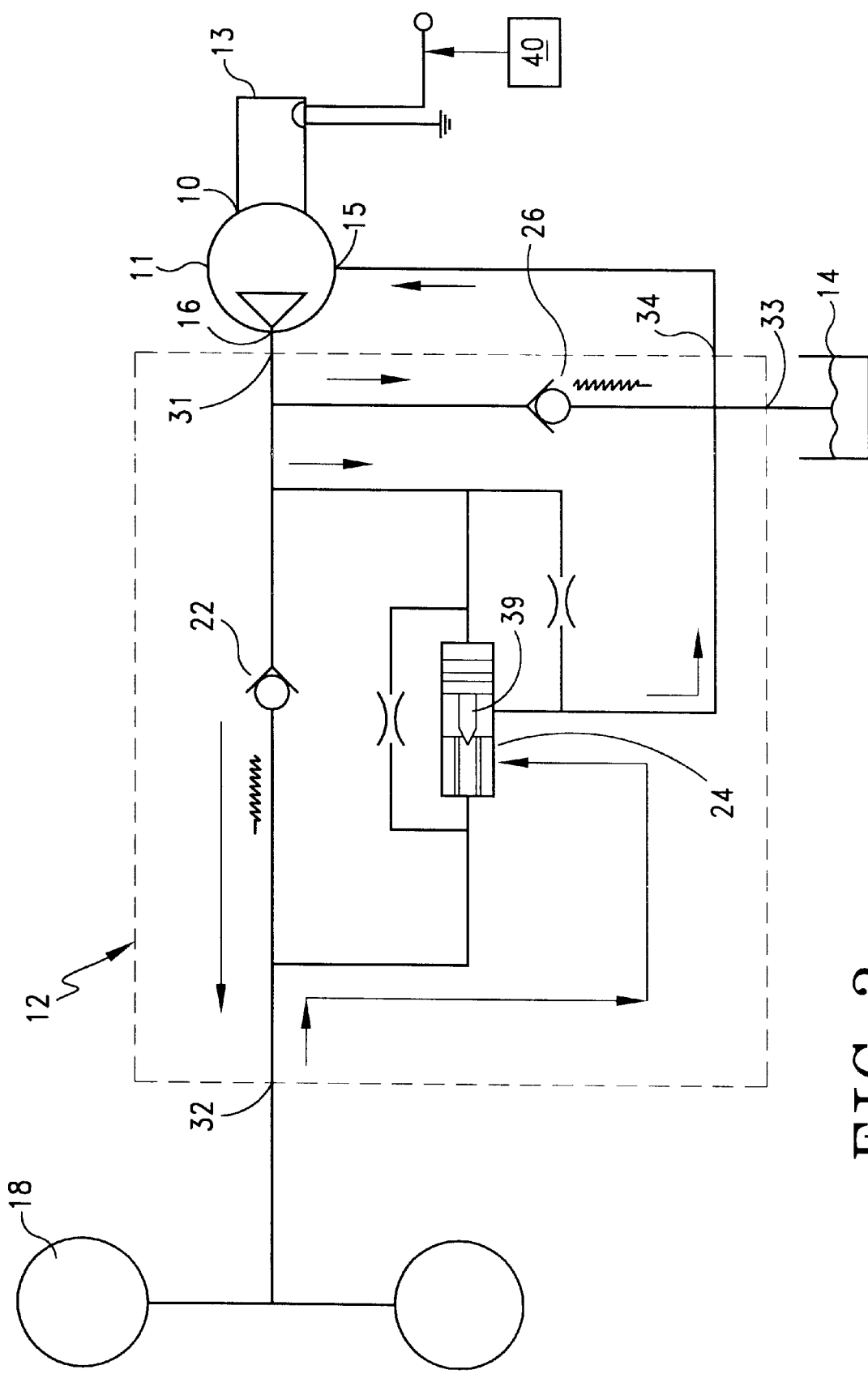
FIG. 2 is a schematic of the present system including a hydraulic pressure generator, a valve manifold, a controller and a brake system.
Figure 5:
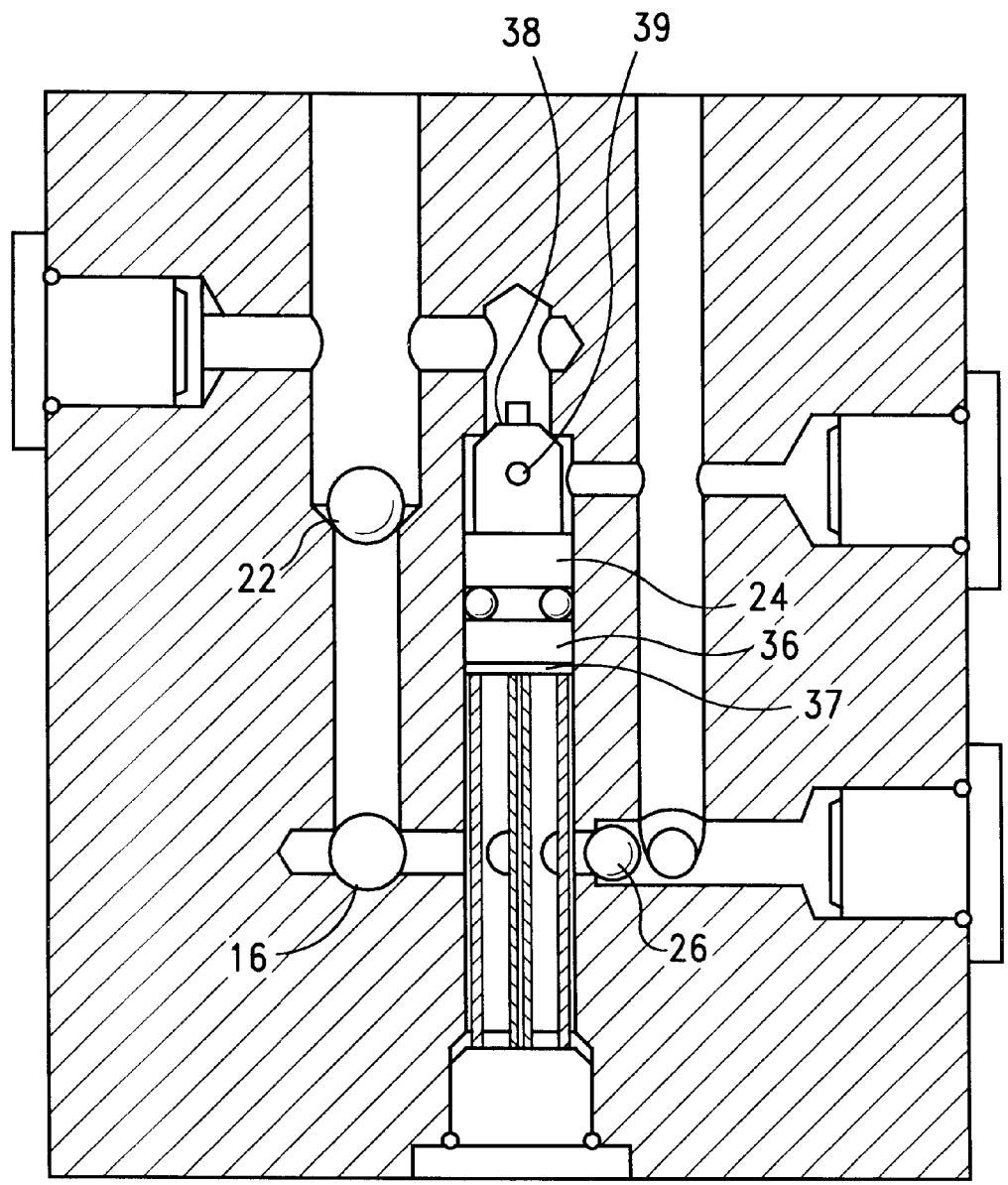
FIG. 5 is a cross sectional view of a valve manifold.
Figure 6:
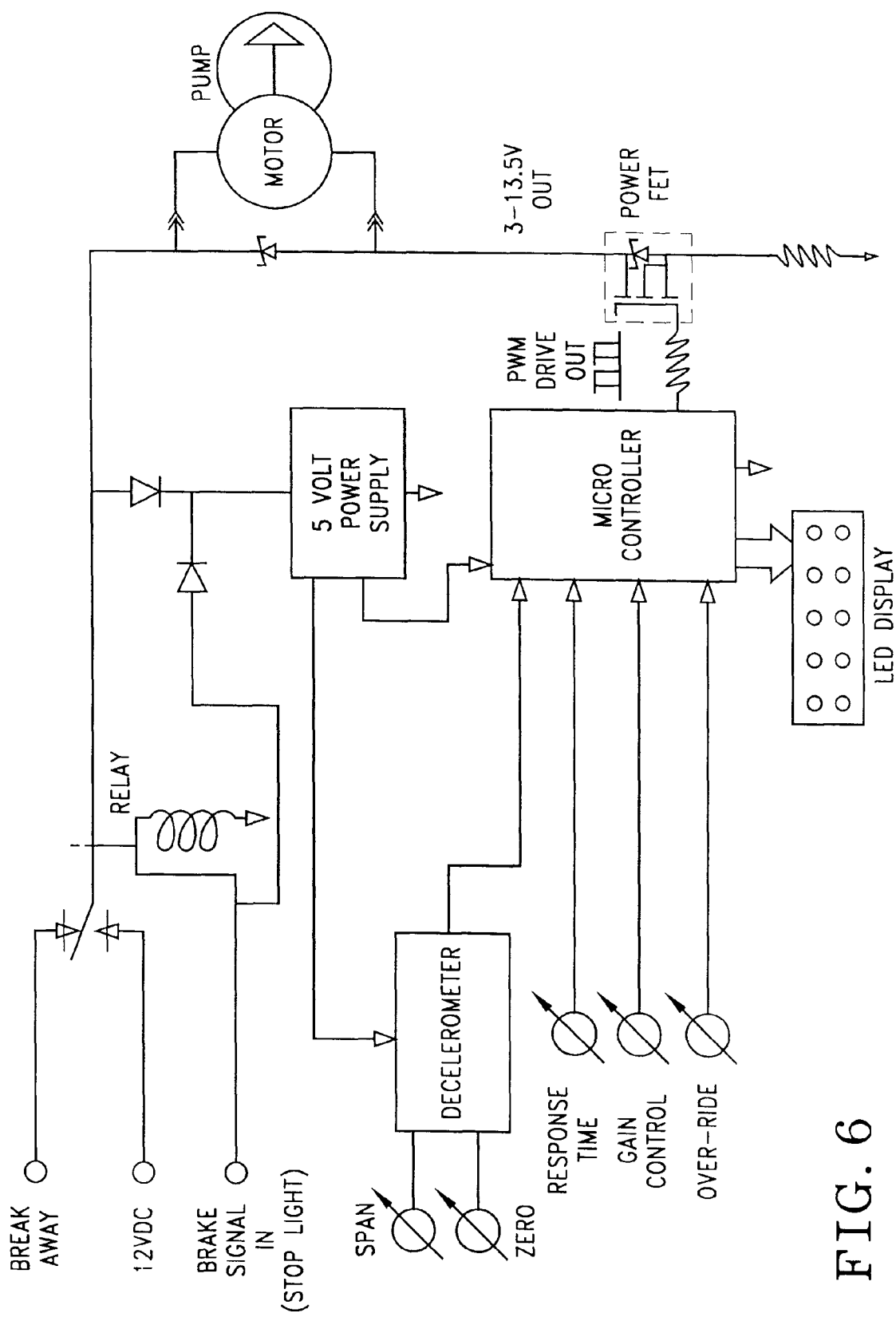
FIG. 6 is a layout of a control circuit.

Referring to FIGS. 2 and 5, the hydraulic pressure generator 10, and specifically an outlet 16 of the hydraulic pump is connected to the valve manifold at the first port 31. The towed vehicle hydraulic brake system 18 is connected to the valve manifold at the second port 32 and the hydraulic fluid reservoir 14 is connected to the valve manifold at the third port 33. An inlet 15 to the hydraulic pressure generator is connected to the fourth port 34 of the valve manifold.

The check valve 22 is in a fluid line between the first port 31 and second port 32 of the valve manifold 12. The check valve 22 is oriented to permit one way fluid flow from the hydraulic pressure generator 10 to the towed vehicle brake system 18 and precludes fluid flow through and from the towed vehicle brake system to the hydraulic pressure generator.

The metered unloading valve 24 is in parallel with the check valve 22. The unloading valve 24 includes a poppet 36 movable between a seated position and an unseated position. The poppet 36 has a large cross sectional area adjacent one end 37 of the poppet and a small cross sectional area adjacent a second end 38 of the poppet. The large cross sectional area is exposed to the hydraulic pressure generator 10 and the small cross sectional area is exposed to the towed vehicle brake system 18.

The poppet 36 includes a metered bleed passage 39. The bleed passage 39 is open independent of the position of the poppet 36. The bleed passage 39 allows a continuous flow of hydraulic fluid from the hydraulic pressure generator 10 side of the check valve 22 to the reservoir 14. Preferably, only a nominal pressure is required to induce flow through the bleed passage 39. The bleed passage 39 has a predetermined cross sectional area. A typical cross sectional area for the bleed passage is approximately $1 \times 10^{-4}$ square inches.

The pump 11 of the hydraulic pressure generator 10 is connected to the towed vehicle brake system 18 via the check valve 22. The pump 11 of the hydraulic pressure generator 10 is also fluidly connected to the large cross sectional area end 37 of the unloading valve poppet 36 and the bleed passage 39. The pump 11 of the hydraulic pressure generator 10 is also fluidly connected to the hydraulic fluid reservoir 14 via the relief valve 26 and the fourth port 34 in the valve manifold 12.

The small cross sectional area end 38 of the poppet 36 is exposed to the towed vehicle brake system 18, such that the check valve 22 is intermediate the hydraulic pressure generator 10 and the small cross section end 38 of the poppet. The small cross section end 38 of the poppet and bleed passage 36 is fluidly exposed to the hydraulic fluid reservoir 14, downstream of the relief valve 26.

The relief valve 26 is in the fluid line between the first port 31 and the check valve 22, and thus, located between the hydraulic pressure generator 10 and the hydraulic fluid reservoir 14. The relief valve 26 vents hydraulic pressure on the hydraulic pressure generator 10 side of the unloading valve 24. The threshold of the relief valve 26 may have any of a variety of limits, and is generally determined by the intended operating parameters of the towed vehicle braking system 18.

The relief valve 26 is located in the hydraulic circuit to ensure that the system will not be over pressurized. The relief valve 26 may be any of a variety of pressure levels and an anticipated pressure level is approximately 900 psi.

It is anticipated that a typical operating system will function in the range of approximately 300 psi to approximately 500 psi on a loaded trailer with drum brakes. It is anticipated that approximately 400 psi to approximately 800 psi will be employed with trailers with disc brakes.

Control System

The control system 40 regulates the amount of power input to the hydraulic pressure generator 10 and hence it regulates the amount of braking force exerted by the towed vehicle brake system 18. The control system will regulate the desired hydraulic pressure between 0 psi and the relief pressure as dictated by the relief pressure valve 26) by controlling the power input to the hydraulic pressure generator 10. The regulation of the power input to the hydraulic pressure generator 10 by the control system may be accomplished by a variety of mechanisms. A first mechanism controls includes a time control 52 and a gain control 54.

The time control is used to set the length of time a predetermined (for example full) power is supplied to the hydraulic pressure generator. The time control sets the duration for an initial braking force via the power input to the hydraulic pressure generator. Typical time periods are anticipated to be approximately one to seven seconds.

The gain control sets the amount of power supplied to the hydraulic pressure generator. In a preferred embodiment, the gain control is configured to set the amount of hydraulic pressure after the time control parameter has lapsed. By setting the amount of gain (amount of power to the hydraulic pressure generator), the gain control allows the operator to set the amount of braking force applied by the towed vehicle brake system after the period set by the time control has lapsed. The gain control is shown in FIGS. 3 and 4, and is readily accessible to the operator to allow control and adjustment without leaving the towing vehicle.

A further configuration employing the gain control includes an ammeter to determine the power from the motor. This configuration has the benefit of not requiring a measurement from the trailer but rather only from the hydraulic pressure generator, or motor. It is understood the control system is calibrated to associate the ammeter reading and the braking force.

An alternative mechanism for controlling the power input to the hydraulic pressure generator employs a decelerometer. The decelerometer produces a voltage in response to a sensed deceleration. The signal is bandwidth modulated and used to set the power input to the hydraulic pressure generator. The decelerometer is a commercially available device, usually embedded on a chip.

Operation

The present braking system is operably connected to the towed vehicle brake system.

Under the time/gain control configuration, the time control is set to a predetermined time period, usually one to seven seconds. The gain control is set to a predetermined level of desired level for the braking force, after the predetermined time period has lapsed.

Upon application of the brakes in the towing vehicle, power is supplied to hydraulic pressure generator.

Preferably, a sufficient amount of power is applied to the hydraulic pressure generator to generate the maximum flow rate. By applying a full flow rate from the hydraulic pressure generator, a maximum pressure, as set by the relief valve, is reflected from the unloading valve. The reflected pressure acts on the towed vehicle brakes via the check valve in the valve manifold.

The flow from the hydraulic pressure generator is also directed to the large diameter of the unloading metered valve causing the poppet to close against its seat. The poppet closes as the force on each end of the poppet equals the pressure at the respective end multiplied by the cross sectional area, and the force on the large cross sectional area of the poppet seats the poppet. Thus, flow from the towed vehicle brake system, through the unloading valve to the reservoir is precluded.

As the unloading valve is seated, a small amount of hydraulic fluid is metered through the poppet valve via the bleed pressure and returns to the reservoir. This metered flow ensures that the pump will unload when power is removed from the hydraulic pressure generator.

The amount of power applied to the hydraulic pressure generator is continued to sustain the full flow rate (and resulting maximum reflected pressure on the towed vehicle brakes) until the preset time period has elapsed.

After the preset time period has elapsed, the gain control regulates the continuing amount of power to the hydraulic pressure generator. Typically, the gain control is set to provide a reduce braking force. Therefore, the power input to the hydraulic pressure generator is reduced, reducing the flow rate from the hydraulic pressure generator and reducing the reflected pressure acting on the towed vehicle brake system.

When power is removed from the hydraulic pressure generator, and specifically the motor, the hydraulic pump is unloaded. Unloading occurs as the remaining pressure in the line between the check valve and the large cross sectional area end of the poppet causes a continued flow through the bleed passage, thereby dropping the pressure between the unloading valve and the hydraulic pump.

The continued flow through the bleed passage after the power has been terminated, or reduced, reduces the hydraulic pressure acting on the large cross sectional area end of the poppet. The check valve provides that when the hydraulic pressure acting on the large cross sectional area of the poppet is reduced, the now larger pressure acting on the towed vehicle brakes remains on the small cross sectional area end of the poppet. This pressure differential becomes sufficient to unseat the poppet and permit flow of the hydraulic fluid from the towed vehicle brake system to the reservoir.

The flow of hydraulic fluid from the towed vehicle brake system through the unloading valve to the reservoir continues until a sufficient (or reflected pressure) acts on the larger cross sectional area end of the poppet. Thus, depending upon the flow from the hydraulic pressure generator (power input to the hydraulic pressure generator), the hydraulic pressure acting on the towed vehicle brake system is reduced or removed.

The bleed passage through the unloading valve also ensures that the pump will not encounter hydraulic pressure during start up. That is, as the fluid path between the hydraulic pressure generator and the unloading valve is not sealable (because of the bleed passage), when the power is removed from the hydraulic pressure generator, the pressure in the line will drop to the threshold pressure required to induce flow through the bleed passageway.

The present invention produces a controllable braking force in the towed vehicle that is proportional to the power input to the hydraulic pressure generator. The amount of power to the hydraulic pressure generator can be regulated by the decelerometer, the ammeter or the time and gain controls. The particular implementation of the power input regulation is at least partially determined by the intended operating environment.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A control system for use with a towed vehicle hydraulic brake system and adapted to be connected to a towing vehicle having an electrical system, the control system comprising:
    (a) a hydraulic pressure generator configured for electrical interconnection to the towing vehicle electrical system and for hydraulic interconnection to the towed vehicle hydraulic brake system for providing pressurized hydraulic fluid to the towed vehicle hydraulic brake system; and
    (b) a control for receiving an operator-selected input representative of a desired towed vehicle braking force; and coupled to the hydraulic pressure generator for varying the amount of electrical power input to the hydraulic pressure generator corresponding to the operator selected input representative of the desired towed vehicle braking force to produce a proportional pressure of the hydraulic fluid provided to the towed vehicle hydraulic brake system, the control including one of an ammeter and a decelerometer.

2. The control system of claim 1, wherein the hydraulic pressure generator includes an electric motor and a pump.

3. The control system of claim 1, further comprising a valve manifold intermediate the hydraulic pressure generator and the towed vehicle brake system.

4. The control system of claim 3, wherein the valve manifold includes a check valve oriented to permit flow from the hydraulic pressure generator to the towed vehicle brake system and an unloading valve in parallel with the check valve.

5. The control system of claim 4, wherein the unloading valve includes a bleed passage.

6. The control system of claim 3, wherein the valve manifold includes a relief valve intermediate the hydraulic pressure generator and a hydraulic fluid reservoir.

7. The control system of claim 1, wherein the control includes a time control for regulating the duration of the electrical power input to the hydraulic pressure generator.

8. The control system of claim 1, wherein the control includes a gain control for setting the amount of the electrical power input to the hydraulic pressure generator.

9. A trailer including the hydraulic control system of claim 1.

10. A hydraulic control system configured for use in connection with a towed vehicle hydraulic brake system including a hydraulic brake and a tank of hydraulic fluid for actuating the brake and adapted to be connected to a towing vehicle having a brake and an electrical system for providing a brake signal upon actuation of the towing vehicle brake, the hydraulic control system comprising:
    (a) a pump for electrical interconnection to the towing vehicle electrical system and for hydraulic interconnection between the tank of hydraulic fluid and brake of the towed vehicle hydraulic system, for providing in response to the towing vehicle brake signal a pressurized hydraulic fluid to the brake corresponding to an operator selected input; and (b) an operator-actuated switch operably connected to one of a time control, gain control, ammeter and decelerometer for generating the operator-selected input to provide a corresponding variable amount of power input to the pump.

11. The hydraulic control system of claim 10, wherein the operator-selected input is an electrical signal representative of one of a time control and a gain control.

12. A trailer including the hydraulic control system of claim 10.

13. The hydraulic control system of claim 10, wherein the hydraulic pressure control manifold includes a pressure relief valve and a check valve interconnected between the pump and brake.

14. A trailer including the hydraulic control system of claim 13.

15. A braking system for a towed vehicle, comprising:

(a) a hydraulic pressure generator for producing a hydraulic pressure proportional to an electrical power input to the hydraulic pressure generator, the hydraulic pressure generator connected to the braking system in the towed vehicle;

(b) a valve assembly fluidly connected to the hydraulic pressure generator and the braking system in the towed vehicle, the valve assembly having a pressure relief valve, an unloading valve and a check valve, the unloading valve having a bleed passage; and (c) a controller connected to the hydraulic pressure generator for controlling the amount of electrical power input to the hydraulic pressure generator;

the controller and the valve assembly selected to create a braking force in the towed vehicle proportional to the electrical power input to the hydraulic pressure generator.

16. The braking system of claim 15, wherein braking force in the towed vehicle is directly proportional to the electrical power input to the hydraulic pressure generator.

17. A control system for use with a towed vehicle hydraulic brake system and adapted to be connected to a towing vehicle having an electrical system, the control system comprising:

(a) a hydraulic pressure generator configured for electrical interconnection to the towing vehicle electrical system and for hydraulic interconnection to the towed vehicle hydraulic brake system for providing pressurized hydraulic fluid to the towed vehicle hydraulic brake system;

(b) a valve manifold intermediate the hydraulic pressure generator and the towed vehicle brake system, the valve manifold includes a check valve oriented to permit flow from the hydraulic pressure generator to the towed vehicle brake system and an unloading valve in parallel with the check valve, the unloading valve includes a bleed passage; and (c) a control for receiving an operator-selected input representative of a desired towed vehicle braking force; and coupled to the hydraulic pressure generator for varying the amount of electrical power input to the hydraulic pressure generator corresponding to the operator selected input representative of the desired towed vehicle braking force to produce a proportional pressure of the hydraulic fluid provided to the towed vehicle hydraulic brake system.

18. The control system of claim 17, wherein the hydraulic pressure generator includes an electric motor and a pump.

19. A control system for use with a towed vehicle hydraulic brake system and adapted to be connected to a towing vehicle having an electrical system, the control system comprising:

(a) a hydraulic pressure generator configured for electrical interconnection to the towing vehicle electrical system and for hydraulic interconnection to the towed vehicle hydraulic brake system for providing pressurized hydraulic fluid to the towed vehicle hydraulic brake system; and (b) a control for receiving an operator-selected input representative of a desired towed vehicle braking force; and coupled to the hydraulic pressure generator for varying the amount of electrical power input to the hydraulic pressure generator corresponding to the operator selected input representative of the desired towed vehicle braking force to produce a proportional pressure of the hydraulic fluid provided to the towed vehicle hydraulic brake system, the control including a time control for regulating the duration of the electrical power input to the hydraulic pressure generator.

20. The control system of claim 19, wherein the hydraulic pressure generator includes an electric motor and a pump.

* * * * *